US009744522B2

(12) United States Patent
Hasegawa et al.

(10) Patent No.: US 9,744,522 B2
(45) Date of Patent: Aug. 29, 2017

(54) POROUS ALUMINA MATERIAL, PROCESS FOR PRODUCING SAME, AND CATALYST

(71) Applicants: Renaissance Energy Research Corporation, Kyoto-shi, Kyoto (JP); Institute of National Colleges of Technology, Japan, Tokyo (JP)

(72) Inventors: Akira Hasegawa, Aomori (JP); Osamu Okada, Kyoto (JP); Chihiro Ito, Kyoto (JP)

(73) Assignees: Renaissance Energy Research Corporation, Kyoto (JP); Institute of National Colleges of Technology, Japan, Tokyo (JP)

(*) Notice: Subject to any disclaimer, the term of this patent is extended or adjusted under 35 U.S.C. 154(b) by 0 days.

(21) Appl. No.: 14/814,034

(22) Filed: Jul. 30, 2015

(65) Prior Publication Data

US 2015/0336083 A1 Nov. 26, 2015

Related U.S. Application Data

(63) Continuation-in-part of application No. 13/978,908, filed as application No. PCT/JP2012/050635 on Jan. 13, 2012, now Pat. No. 9,440,222.

(30) Foreign Application Priority Data

Jan. 14, 2011 (JP) .................................. 2011-006002

(51) Int. Cl.
| | | |
|---|---|---|
| B01J 21/12 | (2006.01) | |
| B01J 35/04 | (2006.01) | |
| B01J 35/10 | (2006.01) | |
| B01J 37/03 | (2006.01) | |
| B01J 37/08 | (2006.01) | |
| B01J 23/02 | (2006.01) | |
| B01J 23/10 | (2006.01) | |
| B01J 23/70 | (2006.01) | |
| B01J 32/00 | (2006.01) | |
| B01J 35/00 | (2006.01) | |
| B01J 37/00 | (2006.01) | |

(52) U.S. Cl.
CPC ............ *B01J 21/12* (2013.01); *B01J 23/02* (2013.01); *B01J 23/10* (2013.01); *B01J 23/70* (2013.01); *B01J 32/00* (2013.01); *B01J 35/002* (2013.01); *B01J 35/04* (2013.01); *B01J 35/1019* (2013.01); *B01J 35/1042* (2013.01); *B01J 37/0036* (2013.01); *B01J 37/03* (2013.01); *B01J 37/088* (2013.01); *C01B 2203/0233* (2013.01); *C01B 2203/107* (2013.01); *C01B 2203/1058* (2013.01); *C01B 2203/1064* (2013.01); *C01B 2203/1082* (2013.01)

(58) Field of Classification Search
None
See application file for complete search history.

(56) References Cited

U.S. PATENT DOCUMENTS

| | | | |
|---|---|---|---|
| 2,394,796 A | 2/1946 | Marisic | |
| 4,778,779 A | 10/1988 | Murrell et al. | |
| 4,837,193 A * | 6/1989 | Akizuki ................... | B01J 23/85 208/112 |
| 6,267,874 B1 * | 7/2001 | Iijima ...................... | B01J 21/12 208/111.3 |
| 6,652,612 B2 | 11/2003 | Nakayama et al. | |
| 2006/0011512 A1 | 1/2006 | Espinoza et al. | |

FOREIGN PATENT DOCUMENTS

| | | |
|---|---|---|
| JP | 09-025119 A | 1/1997 |
| JP | 10-194733 A | 7/1998 |
| JP | 2000-000465 A | 1/2000 |
| JP | 2002-159849 A | 6/2002 |
| JP | 2003-073997 A | 3/2003 |
| JP | 2004-203654 A | 7/2004 |
| JP | 2006-232657 A | 9/2006 |
| JP | 2009-061383 A | 3/2009 |

OTHER PUBLICATIONS

International Search Report issued in corresponding International Patent Application No. PCT/JP2012/050635 dated Apr. 24, 2012.
International Preliminary Report on Patentability issued in corresponding International Patent Application No. PCT/JP2012/050635 dated Jul. 25, 2013.
Office Action issued in Chinese Patent Application No. 201280005411.9 dated Jun. 5, 2014.
Lin et al., "Effect of Thermal Treatment on the Nanostructure of SiO—Al2O3 Xerogels," Journal of Non-Crystalline Solids, 215: 146-154 (1997).
Okada et al., "Effect of Preparation Conditions on the Porous Properties of Coprecipitated Al2O3—SiO2 Xerogels Synthesized from Aluminium Nitrate Nonahydrate and Tetraethylorthosilicate," Microporous and Mesoporous Materials, 37: 355-364 (2000).
He et al., "Synthesis and Structural Characterization of SiO2—Al2O3 Xerogels," Key Engineering Materials, 336-338: 2286-2289 (2007).

(Continued)

*Primary Examiner* — Melvin C Mayes
*Assistant Examiner* — Colette Nguyen
(74) *Attorney, Agent, or Firm* — Morgan, Lewis & Bockius LLP

(57) ABSTRACT

Provided is a production method for a porous alumina material, comprising the steps of: mixing an alkoxysilane solution that comprises an alkoxysilane, a mixed solvent comprising water and an alcohol, and an inorganic acid, with an aluminum solution comprising an aluminum compound and water, to prepare a mixed solution in which the aluminum compound and the alkoxysilane are dissolved in the mixed solvent; co-precipitating aluminum hydroxide with a silicon compound in the mixed solution, to form a precipitate; and baking the precipitate to form a porous alumina material comprising aluminum oxide and silicon oxide.

5 Claims, 20 Drawing Sheets

(56) References Cited

OTHER PUBLICATIONS

Takahashi et al., "Change in local coordination structure of aluminium cations in silica-alumina solution during coprecipitation," Journal of Non-Crystalline Solids, 351: 826-832 (2005).
Parida et al., "Synthesis and characterization of nano-sized porous gamma-alumina by control precipitation method," Materials Chemistry and Physics, 113: 244-248 (2009).
Notice of Allowance issued in related U.S. Appl. No. 13/978,908 dated May 6, 2016.
Okada et al., "Porous properties of coprecipitated $Al_2O_3$—$SiO_2$ xerogels prepared from aluminium nitrate nonahydrate and tetraethylorthosilicate," Journal of Materials Chemistry, 9: 1307-1312 (1999).
Extended European Search Report issued in counterpart European Patent Application No. 12734430.7 dated Mar. 13, 2017.

\* cited by examiner

POROUS ALUMINA MATERIAL, PROCESS FOR PRODUCING SAME, AND CATALYST

CROSS-REFERENCE TO RELATED APPLICATION(S)

This is a Continuation-in-Part of U.S. application Ser. No. 13/978,908, filed Aug. 16, 2013, now U.S. Pat. No. 9,440,222, which is National Stage Entry into the United States Patent and Trademark Office from International PCT Patent Application No, PCT/JP2012/050635, having an international filing date of Jan. 13, 2012, which claims priority to both Japanese Patent Application No. 2011-006002, filed Jan. 14, 2011.

TECHNICAL FIELD

The present invention relates to a porous alumina material, a method for producing the same, and a catalyst that uses the porous alumina material.

BACKGROUND ART

Porous alumina materials having a large specific surface area such as γ-alumina or the like, are useful as catalyst supports on which a catalytic substance is supported, or as filters or the like. Studies aimed at improving the characteristics of such materials have been conducted on an ongoing basis (for instance Patent Literatures 1 to 5).

CITATION LIST

Patent Literature

Patent Literature 1: Japanese Patent Application Publication No. 2009-61383
Patent Literature 2: Japanese Patent Application Publication No. 2004-203654
Patent Literature 3: Japanese Patent Application Publication No. H10-194733
Patent Literature 4: Japanese Patent Application Publication No. H9-25119
Patent Literature 5: Japanese Patent Application Publication No. 2006-232657

SUMMARY OF INVENTION

Technical Problem

However, conventional porous alumina materials having a large specific surface area, for instance γ-alumina or the like, undergo easily transition to the α phase, very quickly at a high temperatures of 1000° C. or higher, but also at lower temperatures, over long periods of time. The material exhibits thereupon a marked drop in specific surface area. Transition to the α phase tends to be yet more pronounced in water vapor atmospheres and under higher pressures. A problem arises as a result in that the heat resistance of conventional porous alumina materials is not necessarily sufficient. In particular, when the specific surface area in the porous alumina material that are used as catalyst supports drops, catalytic activity is impaired. Accordingly, it is very important in practice that the material exhibits heat resistance such that a large specific surface area is retained even at high temperature.

Such being the case, it is a main object of the present invention to provide a porous alumina material having sufficiently high heat resistance.

Solution to Problem

The present invention relates to a method for production of a porous alumina material, the process comprising the steps of: mixing an alkoxysilane solution that comprises an alkoxysilane, a mixed solvent comprising water and an alcohol, and an inorganic acid, with an aluminum solution comprising an aluminum compound and water, to prepare a mixed solution in which the aluminum compound and the alkoxysilane are dissolved in the mixed solvent; co-precipitating aluminum hydroxide with a silicon compound in the mixed solvent, to form a precipitate; and baking the precipitate to form a porous alumina material comprising aluminum oxide and silicon oxide.

The porous alumina material that can be obtained using the method for production according to the present invention preserves a large specific surface area, even at a high temperature, and has sufficiently high heat resistance as to allow the material to be used as a catalyst support or the like that is exposed to high temperatures. The elicited effect of increasing heat resistance can be attributed to the high degree of Si dispersion that is achieved through co-precipitation. Although the solubility of alkoxysilanes in water is ordinarily low, the alkoxysilane solution comprises herein an inorganic acid; as a result, it becomes possible to produce easily a homogeneous alkoxysilane solution, and by extension also a porous alumina material having high heat resistance, even using a small amount of the alcohol. Reducing the use amount of the alcohol is very important in actual practice, from the viewpoint of economic efficiency, etc. Specifically, the alkoxysilane solution preferably comprises 3 to 20 mass % of an alcohol and 70 to 95 mass % of water with respect to a total mass of the alkoxysilane solution.

With a view to further increasing heat resistance, preferably, the precipitate is baked after formation of the boehmite in the precipitate.

In another aspect, the present invention relates to a catalyst that comprises a porous alumina material obtainable by the method for production according to the present invention, and a catalyst substance that is supported on the porous alumina material.

In the catalyst according to the present invention, the large specific surface area of the catalyst support is retained even at high temperatures. The catalyst boasts as a result high heat resistance.

Advantageous Effects of Invention

The present invention provides a porous alumina material having sufficiently high heat resistance.

DESCRIPTION OF EMBODIMENTS

Figure 1:
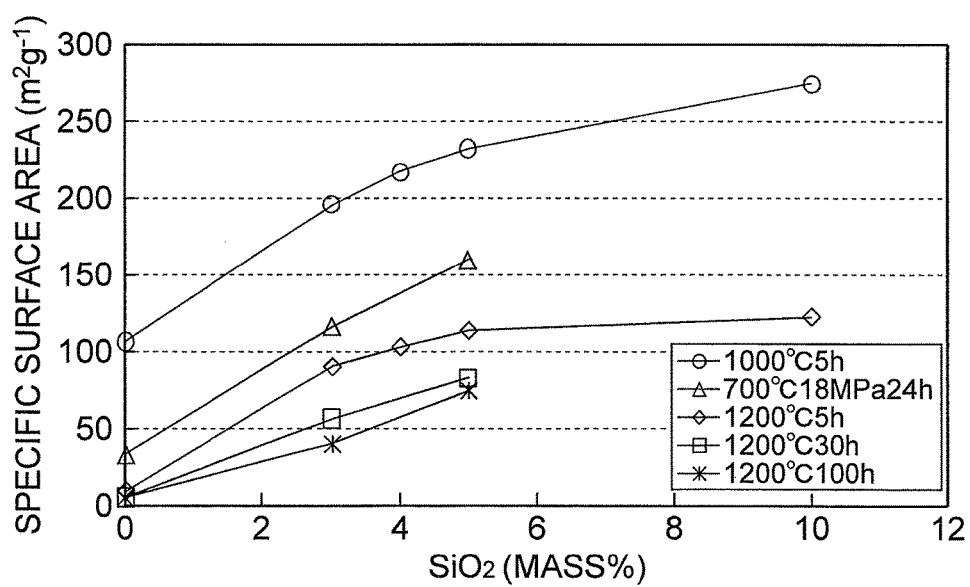
FIG. 1 is a graph illustrating the relationship between the specific surface area of porous alumina materials and $SiO_2$ concentration.

Preferred embodiments of the present invention are explained in detail below. However, the present invention is not limited to the below-described embodiments.

A method for production of a porous alumina material according to the present embodiment comprises mainly: a step of co-precipitating aluminum hydroxide with a silicon compound in a mixed solution that contains a mixed solvent comprising water and alcohol, an aluminum compound, and an alkoxysilane; a step of taking out the precipitate from the mixed solution; a step of drying the precipitate; and a step of baking the dried precipitate, to form thereby a porous alumina material that comprises alumina and silicon oxide.

The mixed solution can be obtained, for example, in accordance with a method that comprises a step of preparing an alkoxysilane solution that comprises an alkoxysilane, a mixed solvent that comprises water and alcohol, and an inorganic acid; and a step of mixing the alkoxysilane solution with an aluminum solution that comprises an aluminum compound and water. The mixing ratio of the alkoxysilane and the aluminum compound is adjusted in such a way so as to correspond to a desired $SiO_2$ concentration in the porous alumina material after baking.

In the alkoxysilane solution, preferably, a single liquid phase is formed as a result of the alkoxysilane being dissolved in the mixed solvent. In this case, the alkoxysilane solution is ordinarily colorless and transparent, without occurrence of cloudiness or phase separation. Although the solubility of alkoxysilanes in water is low, a colorless and transparent alkoxysilane solution can be obtained, for instance, in accordance with a method that involves adding an inorganic acid to a solution in which an alkoxysilane is dissolved in an alcohol, followed by addition of water to the resulting solution. The rate at which water is added is adjusted, as appropriate, in such a manner there is obtained a colorless and transparent alkoxysilane solution. The alkoxysilane is preferably a tetraalkoxysilane. Preferably, the tetraalkoxysilane is selected from among tetramethoxysilane, tetraethoxysilane, tetraisopropoxysilane and tetra-n-butoxysilane. As the alcohol there can be used methanol, ethanol, n-propanol, isopropanol or the like. Hydrochloric acid, nitric acid or the like can be used as the inorganic acid.

The alkoxysilane solution comprises ordinarily 2 mass % or more of the alcohol with respect to the total mass of the alkoxysilane solution. More preferably, the alkoxysilane solution comprises 1 to 20 mass % of the alkoxysilane, 3 to 20 mass % of the alcohol, 0.01 to 10 mass % of the inorganic acid, and 70 to 95 mass % of water, with respect to the total mass of the alkoxysilane solution. A homogeneous alkoxysilane solution can be readily obtained, even using a small amount of the alcohol, when each components is present in such ratios.

The aluminum solution can be obtained by dissolving an aluminum salt in water. Examples of the aluminum salt include, for instance, aluminum nitrate, aluminum chloride and aluminum sulfate. Alternatively, aluminum hydroxide may also be used. An inorganic acid such as nitric acid or the like is preferably used in order to dissolve aluminum hydroxide in water. Herein, it is preferable, in terms of increasing heat resistance, to dissolve aluminum nitrate in water, or to dissolve aluminum hydroxide in a nitric acid aqueous solution, to prepare thereby an aqueous solution of an aluminum compound.

In the mixed solution that contains the alkoxysilane and the aluminum compound, the aluminum compound and the alkoxysilane are uniformly dissolved in the mixed solvent made up of water and an alcohol. In other words, a single liquid phase, without phase separation, is formed in the mixed solution. A precipitant that comprises a basic compound is added to the acidic mixed solution, preferably under heating at a temperature from 40 to 100° C. The aluminum hydroxide and the silicon compound co-precipitate as a result of addition of the basic compound until the pH of the mixed solution becomes, for instance, 6 or higher, 7 or higher, 8 or higher, 9 or higher or 10 or higher. A higher pH during formation of the precipitate tends to result in a more pronounced effect of increase in the heat resistance of the obtained porous alumina material. This trend is particularly conspicuous when the amount of $SiO_2$ is small. The upper limit of pH during formation of the precipitate is ordinarily of about 11. The silicon compound contained in the precipitate that is formed through co-precipitation may be an alkoxysilane or a hydrolytic condensate thereof.

The precipitant comprises at least one basic compound selected from the group consisting of, for instance, aqueous ammonia, sodium hydroxide, potassium hydroxide and urea. Aqueous ammonia is preferred among the foregoing.

The precipitate can be taken out from the mixed solution in accordance with an ordinary method such as filtering. Preferably, the precipitate is washed with warm water at a temperature ranging from about 40 to 100° C. The precipitate is dried in such a manner that most of the solvent is removed.

Preferably, the precipitate is dried in accordance with a method that involves heating a kneaded product obtained by kneading the precipitate with an organic solvent. A porous alumina material having a larger specific surface area can be obtained as a result. Preferably, the organic solvent has a lower surface tension than that of water. Preferably, the organic solvent has a higher boiling point than that of water. The presence of such an organic solvent during drying of the precipitate can suppress shrinkage of the particles that make up a porous body, to readily preserve a large specific surface area. The organic solvent is not particularly limited, but, preferably, includes at least one kind selected from the group consisting of N,N'-dimethylformamide, ethylene glycol, 1,3-butanediol, 1,4-butanediol, 1,2-propanediol and 1,3-propanediol and ethanol.

The porous alumina material comprising aluminum oxide and silicon oxide is formed through baking of the precipitate after drying. In the formed porous alumina material, the aluminum oxide is made up mainly of intermediate alumina, such as γ-alumina, θ-alumina or the like. Preferably, the porous alumina material comprises γ-alumina, which has a large specific surface area. Preferably, the porous alumina comprises substantially no α-alumina, in that α-alumina has a small specific surface area, and, in addition, may promote transition from γ-alumina to α-alumina. Phase transition of alumina typically take place in the order of from boehmite to γ phase, from γ phase to δ phase, from δ phase to θ phase, and from θ phase to corundum (α phase), resulting from baking temperature increase. Two or more of different phases can exist together. For example, δ phase may coexist with θ phase before formation of a phase. δ phase of alumina is a tetragonal system with a density of 3.654. Existence of δ phase can be determined based on XRD patterns. The porous alumina material containing δ phase can be obtained by adjusting temperature increasing rate and baking time. The porous alumina material is preferably made up of spherical, needle-like or plate-like particles.

The baking temperature ranges preferably from 500 to 1200° C. Transition to the α phase of aluminum oxide may occur, and the specific surface area may accordingly drop, if the baking temperature is excessively high. The baking time ranges preferably from about 1 hour to about several tens of hours.

Preferably, boehmite (AlOOH) is formed in the precipitate in the time leading up to the baking of the precipitate that is formed through co-precipitation. Herein, boehmite is formed through heating of the precipitate in hot water at a temperature ranging from 50 to 100° C., and/or heating of the precipitate comprising water at a temperature ranging from 50 to 500° C. Heating of the precipitate in order to form boehmite may double as heating for drying the precipitate.

The concentration of silicon oxide in the porous alumina material, i.e. the proportion of silicon oxide with respect to the total mass of silicon oxide plus aluminum oxide, is preferably 1 mass % or higher, more preferably 3 mass % or higher. The effect on increasing heat resistance tends to be lower if the concentration of silicon oxide is low. The concentration of silicon oxide is preferably 30 mass % or lower, more preferably 15 mass % or lower.

The catalyst according to the present embodiment comprises a porous alumina material and a catalyst substance that is supported on the porous alumina material. The catalyst substance is preferably a metal catalyst selected from Ni, Ru, Pt, Rh and Pd, in accordance with the intended application. The catalyst according to the present embodiment may further comprise a co-catalyst. For instance, a combination of La or ceria with Ni, or a combination of ceria with Pt, is used as the co-catalyst.

For instance, the catalyst according to the present embodiment is used for the purpose of steam reforming for the production of hydrogen, and also for combustion gas treatment and automobile exhaust gas treatment. The catalyst according to the present embodiment can retain a high specific surface area even in high-temperature, high-pressure water vapor atmospheres, and hence is particularly useful as a catalyst for steam reforming.

EXAMPLES

The present invention will be explained in further detail next on the basis of examples, but the invention is not limited in any way to these examples.

1. Evaluation Method of the Porous Alumina Material

The specific surface area, pore distribution and total pore volume of porous alumina materials were measured in accordance with a nitrogen adsorption method, using a fully-automated gas adsorption amount measuring device (AUTOSORB-1C by Quantachrome Instruments). The crystal structure of alumina was measured by way of a two-dimensional high-speed detector, through irradiation of CuKα, using an X-ray diffractometer (ULTIMA III, by Rigaku Corporation). The amounts Al and Si in the samples were analyzed in accordance with the spot filter paper method or glass bead method, using an X-ray fluorescence analyzer (Supermini, by Rigaku Corporation).

2. Considerations on $SiO_2$ Blending Amount (1) Preparation of a Tetraethoxysilane Solution Herein, 7.52 g of ethanol were added to 5 g of tetraethoxysilane (hereafter, "TEOS"), with stirring for 5 minutes at room temperature. Next, 1.25 g of hydrochloric acid (37%) were added, with further stirring for 5 minutes at room temperature. Then 71.2 g of water were mixed into the resulting mixed solution, to yield a transparent homogeneous tetraethoxysilane solution.

(2) Preparation of a Porous Alumina Material

The tetraethoxysilane solution obtained in (1) was added, in an amount of 5 g, 6.7 g, 8.4 g or 17.8 g, to an aluminum nitrate aqueous solution in which 20 g of aluminum nitrate nonahydrate had been dissolved in 75 g of water. A respective homogeneous mixed solution was thus obtained. Each mixed solution was heated at 60° C., and 30% aqueous ammonia was dripped thereonto until pH 8 was reached, followed by stirring of the solution for 30 minutes. Aluminum hydroxide and a silicon compound co-precipitated as the aqueous ammonia was dripped, and a precipitate precipitated in the solution. Next, the solution comprising the precipitate was heated under reflux for 2 hours at 100° C., and the precipitate was filtered off by suction filtration using No. 1 filter paper. The precipitate was water-washed in 50 mL of warm water at 60° C., with stirring for 10 minutes, and was then filtered again. This water washing operation was performed once more. The precipitate after water washing was dried for 20 hours in a dryer at 150° C. Thereafter, the dried precipitate was crushed using a mortar, and was baked at 1000° C. for 5 hours in air, to yield a porous alumina material containing 3 mass %, 4 mass %, 5 mass % or 10 mass % of $SiO_2$ with respect to the total mass of $SiO_2$ plus $Al_2O_3$.

As a sample for comparison, a porous alumina material comprising no $SiO_2$ was prepared in accordance with the same operation as described above, but using herein no tetraethoxysilane solution.

(3) Evaluation

FIG. 1 is a graph illustrating measurement results of specific surface area of the porous alumina materials. As illustrated in FIG. 1, it was found that the specific surface area of the porous alumina materials after baking tended to increase through addition of $SiO_2$. For instance, the specific surface area of the porous alumina materials obtained through baking at 1000° C. for 5 hours was 106 $m^2/g$ in the case of the sample for comparison having no $SiO_2$ added thereto, but increased to 274 $m^2/g$, by contrast, in the case of the sample comprising 10 mass % of $SiO_2$.

The specific surface area of the porous alumina materials after having been subjected to aging, instead of baking under conditions of 1000° C. and 5 hours, was likewise measured; herein, aging was performed under conditions of 1200° C. for 30 hours in air, 1200° C. for 100 hours in air, or 700° C. for 24 hours in a high-pressure water vapor atmosphere of 18 MPa in an autoclave. The measurement results are illustrated in FIG. 1.

In the sample for comparison having no $SiO_2$ added thereto, the specific surface area dropped significantly at the 5-hour point in time upon baking at 1200° C. By contrast, the specific surface area of the porous alumina materials comprising $SiO_2$ exhibited high values that were retained over long periods of time, namely 113 $m^2/g$ at 5 hours, 82 $m^2/g$ at 30 hours and 74 $m^2/g$ at 100 hours, for baking at 1200° C. The porous alumina materials exhibited high heat resistance through addition of $SiO_2$ in the case also of aging for 24 hours at 700° C. in an 18 MPa high-pressure water vapor atmosphere.

Figure 2:
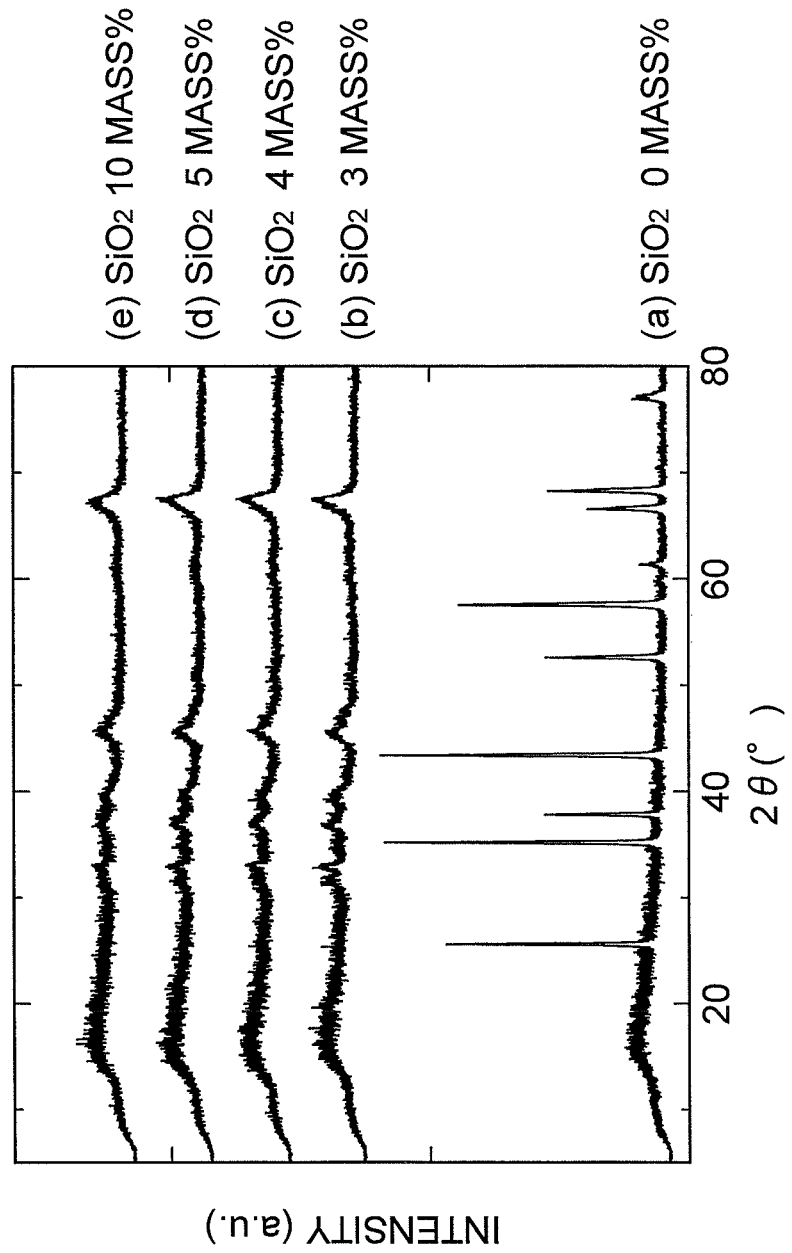
FIG. 2 is a graph illustrating XRD patterns of porous alumina materials.
Figure 3:
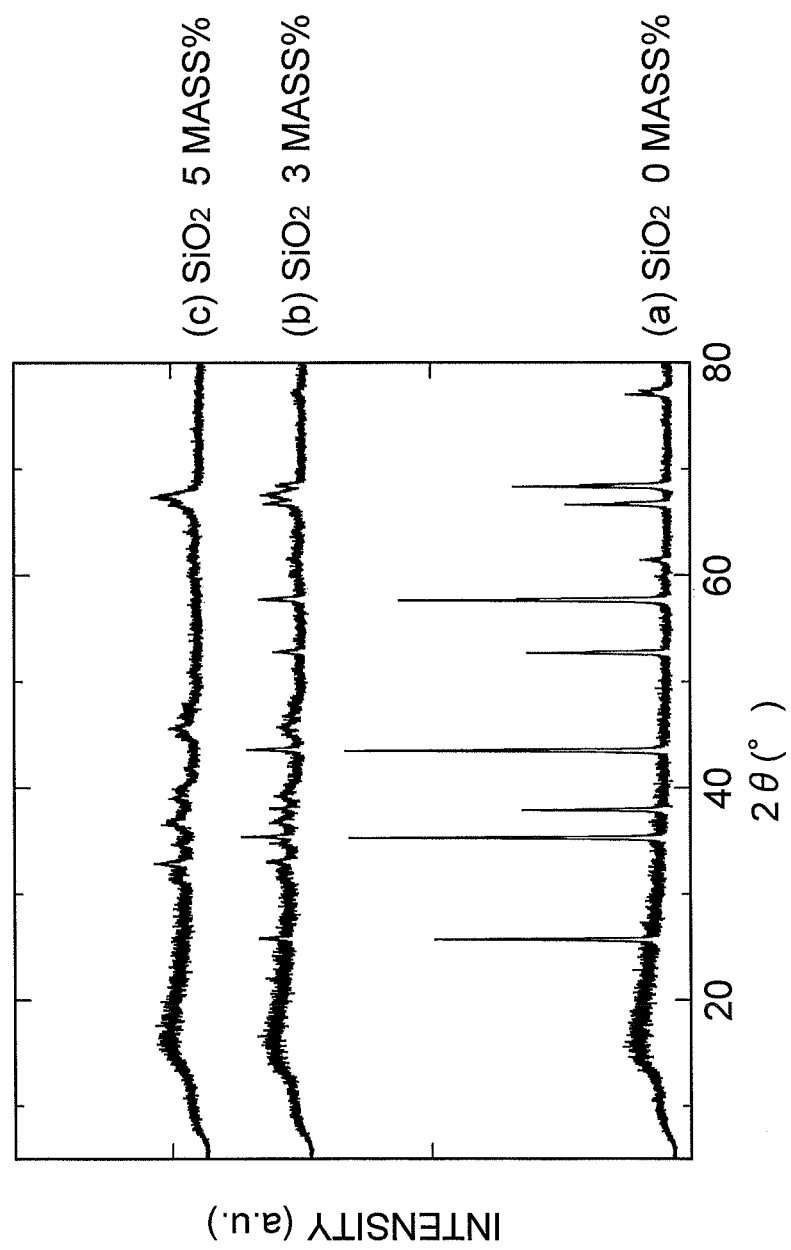
FIG. 3 is a graph illustrating XRD patterns of porous alumina materials.
Figure 4:
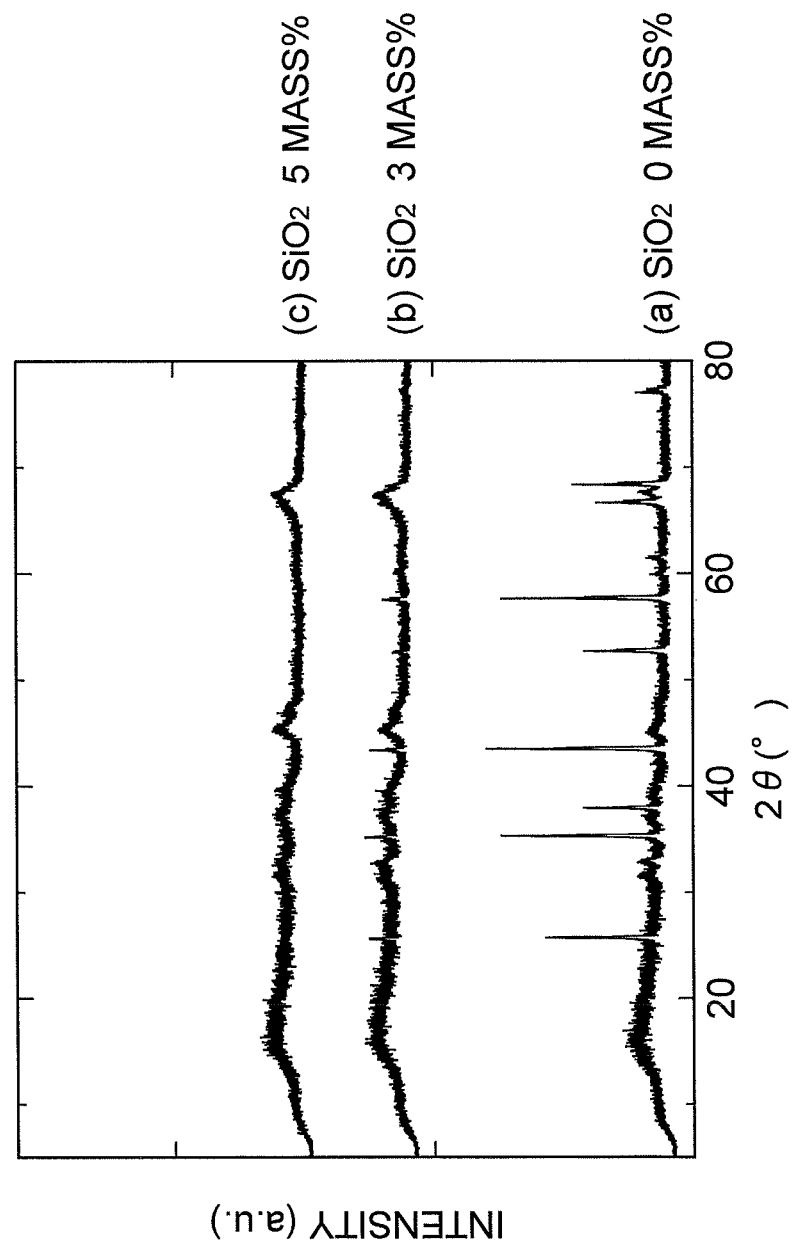
FIG. 4 is a graph illustrating XRD patterns of porous alumina materials.

FIG. 2, FIG. 3 and FIG. 4 are graphs respectively illustrating XRD diffraction patterns of porous alumina materials having undergone aging for 5 hours at 1200° C., for 100 hours at 1200° C., and for 24 hours at 700° C. in a 18 MPa high-pressure water vapor atmosphere. The sample for comparison having no $SiO_2$ added thereto underwent complete phase transition to α-alumina through baking for 5 hours at 1200° C. In the porous alumina materials comprising $SiO_2$, by contrast, there were observed virtually no peaks derived from the α phase, under any of the baking conditions. This indicated that the γ or θ phase was retained.

Figure 5:
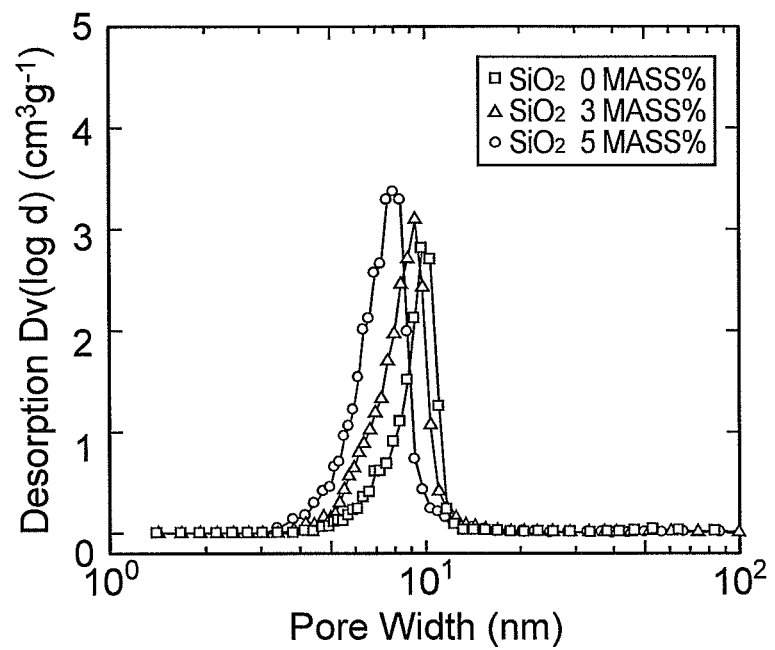
FIG. 5 is a graph illustrating pore distributions of porous alumina materials.

FIG. 5 is a graph illustrating pore distributions of porous alumina materials obtained through baking at 1000° C. for 5 hours. It was found that pore size tended to decrease through addition of $SiO_2$. On the other hand, total pore volume and specific surface area tended to increase as the amount of $SiO_2$ increased. That is, pores become finer, and the specific surface area of the porous alumina material increases, as a result of addition of $SiO_2$. It is deemed that this contributes to increasing the heat resistance of the porous alumina material.

Figure 6:
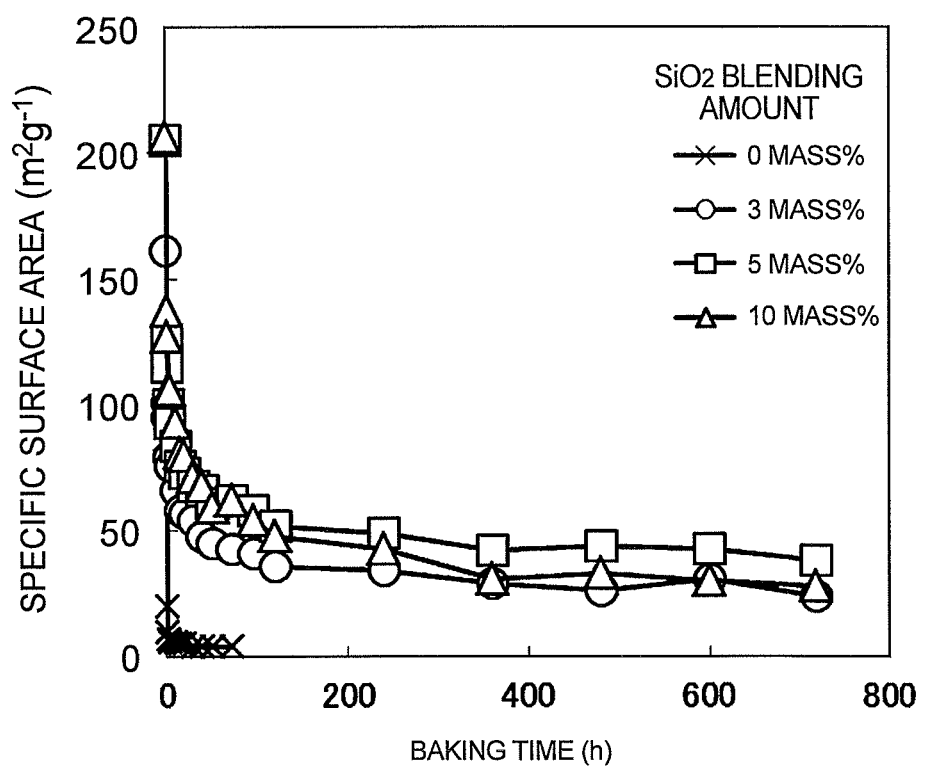
FIG. 6 is a graph illustrating the relationship between the specific surface area of porous alumina materials and baking time.

The samples were subjected to an aging test for a prolonged period of time at 1200° C. FIG. 6 is a graph illustrating the relationship between the specific surface area of the porous alumina materials and baking time, at 1200° C. In the sample for comparison having no $SiO_2$ added thereto, the specific surface area dropped significantly very quickly early in the test. In samples where $SiO_2$ was added, the specific surface area dropped initially, but no large drops in specific surface area over long periods were observed from 96 hours onwards. For instance, the sample with 5 mass % of $SiO_2$ exhibited superior heat resistance in that a high specific surface area of about 40 $m^2/g$ was retained even after 700 or more hours of baking.

3. Considerations on the Co-Precipitation Method of Aluminum Hydroxide and the Silicon Compound 3-1 Co-Precipitation Check A tetraethoxysilane solution was prepared in accordance with the same operation as in (1) in "2. Considerations on $SiO_2$ blending amount". A homogeneous mixed solution was obtained through addition of an amount of the tetraethoxysilane solution equivalent to 5 mass % of $SiO_2$, to the aluminum nitrate aqueous solution. The mixed solution was heated at 60° C., and the amounts of Al and Si in the liquid phase were measured while the pH was modified through dripping of 30% aqueous ammonia. The amounts of Al and Si were evaluated on the basis of measurements of X-ray fluorescence intensity according to a spot filter paper method, for 100 μL of filtrate obtained through filtering of the solution.

Figure 7:
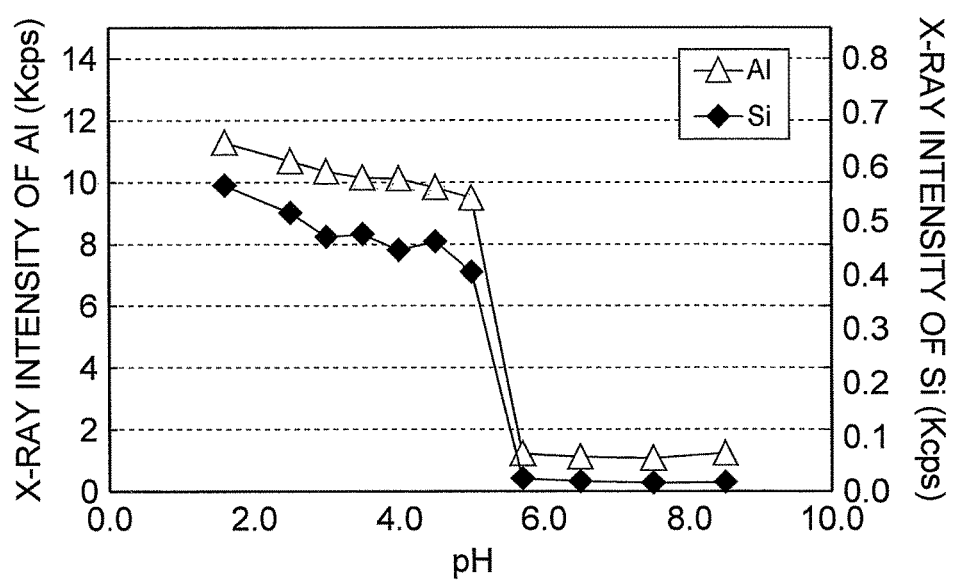
FIG. 7 is a graph illustrating the relationship between pH and X-ray intensity of Al and Si.

FIG. 7 is a graph illustrating the relationship between pH and X-ray fluorescence intensity of Al and Si in the liquid phase. High intensity was retained at pH from 2 to 5 before precipitate formation, but both Al and Si abruptly dropped simultaneously at pH 5 or higher, while substantially no Al or Si was observed in the liquid phase at pH 6 or higher. This suggests that the silicon compound co-precipitates with aluminum hydroxide around pH 5.

No precipitation was observed in a tetraethoxysilane solution comprising no aluminum ions, even through addition of aqueous ammonia, and the X-ray fluorescence intensity of Si remained substantially constant irrespective of changes in pH. Tetraethoxysilane solutions of pH ranging from 6 to 7.5 gelled after being left to stand overnight.

3-2 Method for Preparing a Tetraethoxysilane Solution

A mixed liquid comprising tetraethoxysilane prepared in accordance with the method (a) or (b) below, or stand-alone tetraethoxysilane (c), was added to an aluminum nitrate solution. Otherwise, porous alumina materials were prepared through baking for 5 hours at 1000° C. or 1200° C. according to a procedure identical to that of (2) in "2. Considerations on $SiO_2$ blending amount". The materials were prepared in such a manner that the charge amount of tetraethoxysilane was an amount corresponding to 3 mass % or 10 mass % with respect to the total amount of alumina ($Al_2O_3$) and $SiO_2$.

(a) A tetraethoxysilane solution was prepared in accordance with a procedure identical to that of (1) in "2. Considerations on $SiO_2$ blending amount".

(b) 7.52 g of ethanol were added to 5 g of tetraethoxysilane, with stirring for 5 minutes at room temperature. Next, 1.25 g of hydrochloric acid (37%) were added, with further stirring at room temperature for 5 minutes. The resulting mixed solution was mixed into 71.2 g of water, to yield a mixed liquid comprising tetraethoxysilane. The mixed liquid took on a cloudy state of dispersed droplets immediately after the mixed solution started being dripped.

(c) Tetraethoxysilane (TEOS) was used as-is.

The crystal structure, specific surface area, and $SiO_2$ concentration based on X-ray fluorescence intensity were measured in the obtained porous alumina materials. The measurement results are given in Table 2.

TABLE 1

| Preparation method | TEOS charge amount (SiO$_2$ concentration) mass % | Baking temperature | Specific surface area m$^2$/g | Crystal structure | SiO$_2$ concentration mass % |
|---|---|---|---|---|---|
| (a) | 3 | 1000° C. | 189 | γ | 3.0 |
| (b) | 3 | 1000° C. | 167 | γ | 2.7 |
| (a) | 3 | 1200° C. | 72 | θ | — |
| (b) | 3 | 1200° C. | 56 | α + θ | — |
| (c) | 3 | 1000° C. | 188 | γ | 1.1 |
| (c) | 3 | 1200° C. | 66 | α + θ | — |
| (c) | 10 | 1000° C. | 175 | γ | 1.6 |
| (c) | 10 | 1200° C. | 37 | α | 1.6 |

Figure 8:
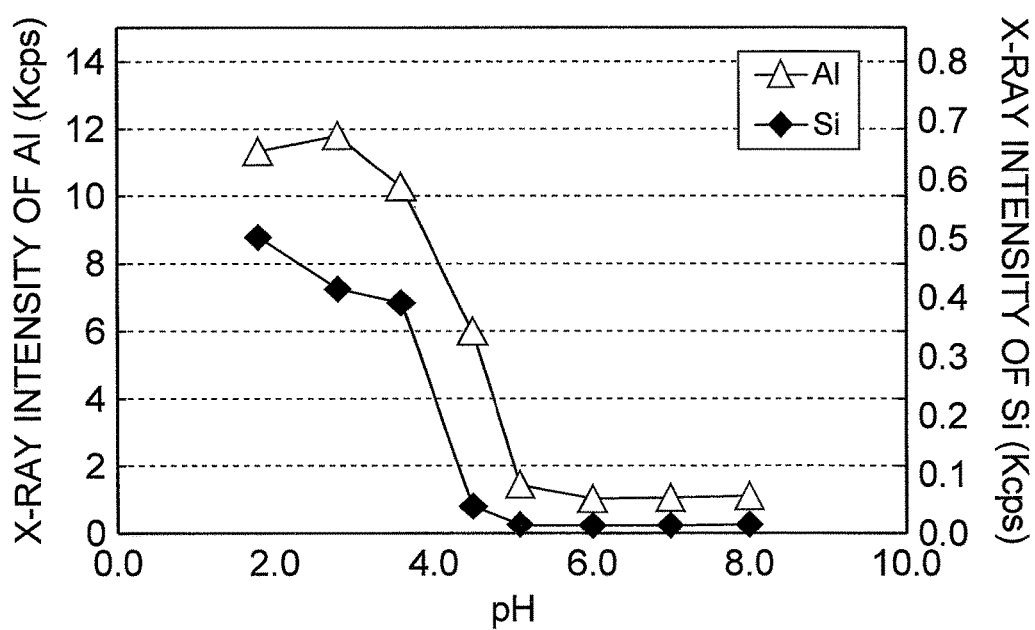
FIG. 8 is a graph illustrating the relationship between pH and X-ray intensity of Al and Si.
Figure 9:
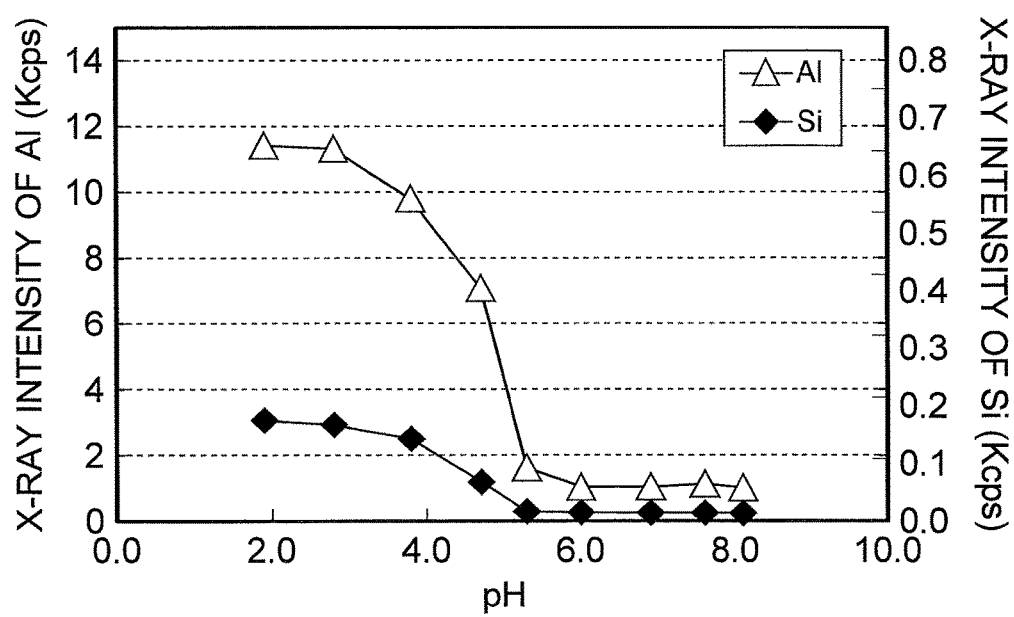
FIG. 9 is a graph illustrating the relationship between pH and X-ray intensity of Al and Si.

The amounts of Al and Si present in the liquid phase upon dripping of aqueous ammonia was evaluated on the basis of the measurements of X-ray fluorescence intensity in accordance with a procedure identical to that of "3-2 Method for preparing a tetraethoxysilane solution". FIG. 8 is a graph illustrating the relationship between pH and X-ray fluorescence intensity of Al and Si in the liquid phase in (b). FIG. 9 is a graph illustrating the relationship between pH and X-ray fluorescence intensity of Al and Si in the liquid phase in (c).

Figure 10:
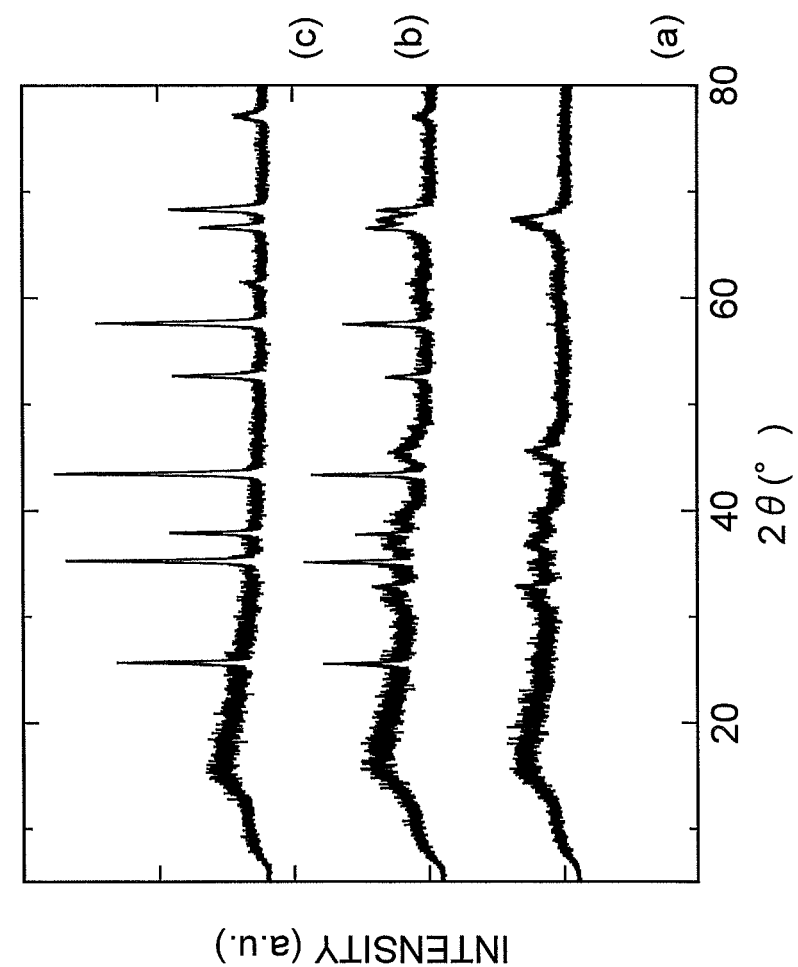
FIG. 10 is a graph illustrating XRD patterns of porous alumina materials.

As illustrated in FIG. 8 and FIG. 9, homogeneous co-precipitation of a silicon compound and aluminum hydroxide, such as the one in (a) (FIG. 7), was not observed in (b) or (c). As Table 1 indicates, the SiO$_2$ concentration in the obtained porous alumina materials was clearly lower than the charge amount. Formation of the α phase, through baking at 1200° C., was not observed in (a); by contrast, formation of the α phase was clearly observed in (b) and (c) (FIG. 10).

The above results indicate that a porous alumina material having high heat resistance can be obtained through co-precipitation of aluminum hydroxide and a silicon compound from a solution in which Al and Si are dissolved in a single phase.

3-3 Composition Ratios in the Tetraethoxysilane Solution

There were prepared tetraethoxysilane solutions having different ratios of ethanol, water and hydrochloric acid components. The results of visual observation of the state of the solutions are given in Table 2. Each tetraethoxysilane solution was prepared in accordance with a method that involved mixing TEOS and ethanol, with stirring for 5 minutes, followed by addition of hydrochloric acid, with stirring, and slow dripping of water under further stirring. Run 1, where the ratio of ethanol was high, was colorless and transparent. It was found that a colorless and transparent tetraethoxysilane solution could be obtained while using little ethanol, and a homogeneous single-phase mixed solution could be obtained, even after mixing with the aluminum aqueous solution, by increasing to some degree the ratio of hydrochloric acid, as in Runs 6 to 8.

TABLE 2

| Run No. | TEOS g | Ethanol g | Water g | Hydrochloric acid g | State of the solution |
|---|---|---|---|---|---|
| 1 | 5.00 | 75.20 | 4.70 | 0.10 | Colorless and transparent |
| 2 | 5.00 | 75.20 | 4.70 | 0 | Colorless and transparent; cloudy after mixing with Al solution (separation into two phases) |
| 3 | 5.00 | 37.60 | 42.40 | 0 | Cloudy |
| 4 | 5.00 | 7.52 | 72.01 | 0.47 | Cloudy |
| 5 | 5.00 | 7.52 | 71.53 | 0.95 | Cloudy |
| 6 | 5.00 | 7.52 | 71.30 | 1.18 | Colorless and transparent |
| 7 | 5.00 | 7.52 | 71.23 | 1.25 | Colorless and transparent |
| 8 | 5.00 | 7.52 | 71.07 | 1.41 | Colorless and transparent |
| 9 | 10.00 | 75.20 | 4.70 | 0.10 | Colorless and transparent; cloudy after mixing with Al solution (separation into two phases) |

4. Considerations on the Method for Adding TEOS

Porous alumina materials were prepared in accordance with methods (a) through (f) below, and the crystal structure and the specific surface area of the materials were measured.

(a) 33.5 g of 30% nitric acid (nitric acid:water=1:1) were added to 4.16 g of aluminum hydroxide, with heating under reflux for 12 hours, to prepare a transparent aluminum aqueous solution. The aluminum aqueous solution was baked for 5 hours at 1000° C. or 1200° C., in accordance with a procedure identical to that of (1) or (2) in "2. Considerations on SiO$_2$ blending amount", to prepare thereby a porous alumina material comprising SiO$_2$.

(b) 33.5 g of 30% nitric acid (nitric acid:water=1:1) were added to 4.16 g of aluminum hydroxide, with heating under reflux for 12 hours, to prepare a transparent aluminum aqueous solution. Stand-alone TEOS was added, as-is, to this aluminum aqueous solution. At this time, TEOS was present, in a phase-separated state, on the surface of the solution. The solution in this state was heated at 60° C., and 30% aqueous ammonia was dripped onto the solution until pH reached 8; thereafter, the solution was further stirred for 30 minutes, to elicit precipitation of a precipitate in the solution. From filtering of the precipitate onwards, a procedure identical to that of (2) in "2. Considerations on SiO$_2$ blending amount" was followed to prepare thereby a porous alumina material through baking for 5 hours at 1000° C. or 1200° C.

(c) 33.5 g of 30% nitric acid (nitric acid:water=1:1) were added to 4.16 g of aluminum hydroxide, with heating under reflux for 12 hours, to prepare a transparent aluminum aqueous solution. The solution was heated at 60° C. and aqueous ammonia was added to the solution, to precipitate aluminum hydroxide at pH 8. A tetraethoxysilane solution prepared in accordance with a procedure identical to that of (1) in "2. Considerations on SiO$_2$ blending amount" was added to the solution comprising aluminum hydroxide precipitate, to elicit precipitation of a silicon compound. From filtering of the precipitate comprising aluminum hydroxide and a silicon compound onwards, a procedure identical to that of (2) in "2. Considerations on SiO$_2$ blending amount" was followed to prepare thereby a porous alumina material through baking for 5 hours at 1000° C. or 1200° C.

(d) 33.5 g of 30% nitric acid (nitric acid:water=1:1) were added to 4.16 g of aluminum hydroxide, with heating under reflux for 12 hours, to prepare a transparent aluminum aqueous solution. The solution was heated at 60° C. and aqueous ammonia was added to the solution, to precipitate aluminum hydroxide at pH 8. The aluminum hydroxide precipitate was filtered off and was washed with warm water at 60° C. Thereafter, the water comprising the precipitate was heated under reflux at 100° C. Then a tetraethoxysilane solution prepared in accordance with a procedure identical to that of (1) in "2. Considerations on SiO$_2$ blending amount" was added to the solution comprising the precipitate. From filtering of the precipitate comprising aluminum hydroxide and a silicon compound onwards, a procedure identical to that of (2) in "2. Considerations on SiO$_2$ blending amount" was followed to prepare thereby a porous alumina material through baking for 5 hours at 1000° C. or 1200° C.

(e) 33.5 g of 30% nitric acid (nitric acid:water=1:1) were added to 4.16 g of aluminum hydroxide, with heating under reflux for 12 hours, to prepare a transparent aluminum aqueous solution. The solution was heated at 60° C. and aqueous ammonia was added to the solution, to precipitate aluminum hydroxide at pH 8. The aluminum hydroxide precipitate was filtered off and was washed with warm water at 60° C. Thereafter, the water comprising the precipitate was heated under reflux at 100° C. The filtered precipitate was dried for 20 hours in a dryer at 150° C., and was then baked through heating at 1000° C. for 5 hours. A powder sample after baking was kneaded with a tetraethoxysilane solution prepared in accordance with a procedure identical to that of (1) in "2. Considerations on SiO$_2$ blending amount". The kneaded product was dried, and was then heated at 1200° C. for 5 hours, to yield a porous alumina material.

(f) 33.5 g of 30% nitric acid (nitric acid:water=1:1) were added to 4.16 g of aluminum hydroxide, with heating under reflux for 12 hours, to prepare a transparent aluminum aqueous solution. The solution was heated at 60° C. and aqueous ammonia was added to the solution, to precipitate aluminum hydroxide at pH 8. The aluminum hydroxide precipitate was filtered off and was washed with warm water at 60° C. Thereafter, the water comprising the precipitate was heated under reflux at 100° C. The filtered precipitate was dried for 20 hours in a dryer at 150° C. The precipitate was baked at 500° C., to yield a powder sample (specific surface area 348 m$^2$/g). Commercially available SiO$_2$ particles (Wakogel, by Wako Pure Chemical Industries, Ltd.) were then physically mixed with the obtained powder sample, to a concentration of 3 mass %. The mixture was baked at 1000° C. or 1200° C. for 5 hours, to yield a porous alumina material comprising SiO$_2$.

(g) 33.5 g of 30% nitric acid (nitric acid:water=1:1) were added to 4.16 g of aluminum hydroxide, with heating under reflux for 12 hours, to prepare a transparent aluminum aqueous solution. The solution was heated at 60° C. and aqueous ammonia was added to the solution, to precipitate aluminum hydroxide at pH 8. A porous alumina material comprising no SiO$_2$ was prepared in accordance with a procedure identical to that of the sample for comparison in "2. Considerations on SiO$_2$ blending amount", from filtering of the precipitate comprising aluminum hydroxide and a silicon compound onwards.

TABLE 3

| Preparation method | TEOS charge amount (SiO$_2$ concentration) mass % | 1000° C. 5 hours | | 1200° C. 5 hours | |
|---|---|---|---|---|---|
| | | Crystal structure | Specific surface area m$^2$/g | Crystal structure | Specific surface area m$^2$/g |
| (a) | 3 | γ | 188 | θ | 85 |
| (a) | 10 | γ | 284 | γ | 123 |
| (b) | 3 | γ | 188 | α | 66 |
| (b) | 10 | γ | 175 | α | 37 |
| (c) | 3 | γ | 200 | α + θ | 67 |
| (d) | 3 | γ | 223 | α + θ | 78 |
| (e) | 3 | — | — | α + θ | 61 |
| (f) | 3 | γ | 125 | α | 13 |
| (g) | 0 | γ | 133 | α | 9 |

As Table 3 shows, no phase transition to the α phase occurred, and no significant drop in specific surface area was observed, such as that of (g) where no SiO$_2$ was added, in the case of the method (a) by co-precipitation of aluminum hydroxide and a silicon compound, even upon baking at 1200° C. The porous alumina materials obtained in accordance with methods (b) through (f) exhibited all phase transition to α-alumina as a result of baking at 1200° C. for 5 hours.

Figure 11:
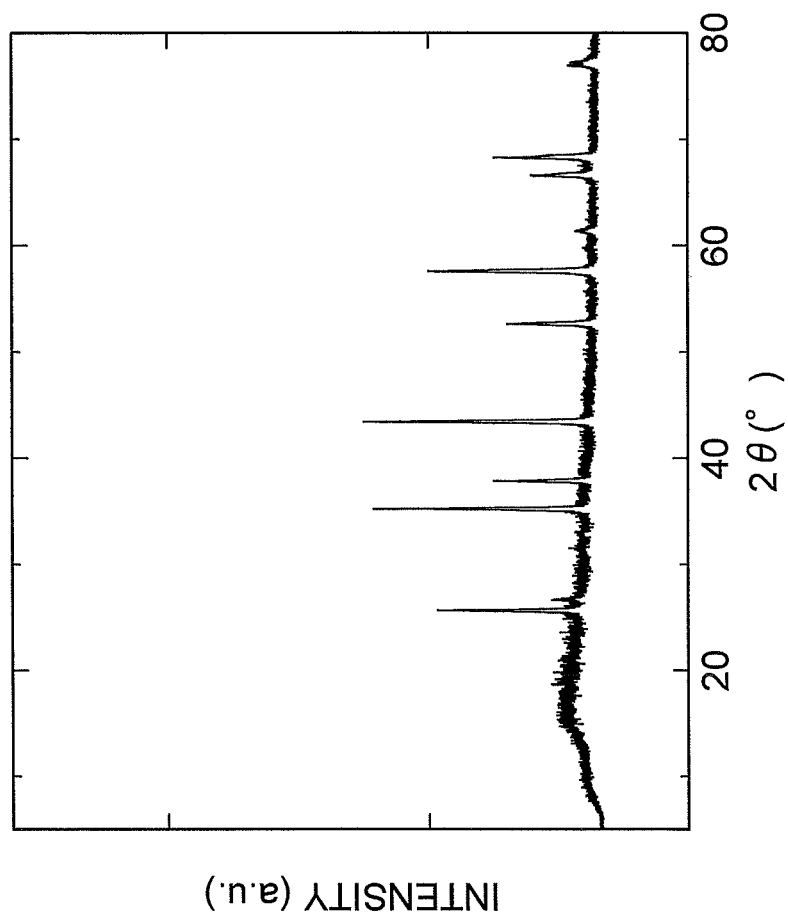
FIG. 11 is a graph illustrating an XRD pattern of a porous alumina material.

FIG. 11 is a graph illustrating an XRD pattern of an industrial alumina catalyst support after having been baked at 1200° C. for 5 hours. The industrial alumina catalyst support is produced in accordance with a method that involves physical mixing of 3.8 mass % of SiO$_2$ with alumina. As FIG. 11 shows, there was observed significant formation of α-alumina as a result of baking at 1200° C. for 5 hours. The specific surface area of the industrial alumina catalyst support after baking was low, of 20 m$^2$/g.

5. Considerations on Solvent Addition.

5-1 Addition of N,N-Dimethylformamide (DMF)

Precipitates comprising a silicon compound and aluminum hydroxide in an amount equivalent to 2.7 g of alumina were formed in accordance with procedures identical to those in (1) and (2) in "2. Considerations on SiO$_2$ blending amount". The precipitate was treated with hot water at 100° C. for 2 hours, and was washed with warm water at 60° C., and then the precipitate was taken out by filtration. The precipitate was kneaded with 10 g of DMF, and the obtained kneaded product was baked at 1000° C. for 5 hours, to yield a porous alumina material. Further porous alumina materials were obtained by modifying the baking conditions of the kneaded product to 1200° C. for 5 hours, or 700° C. in an 18 MPa high-pressure water vapor atmosphere for 24 hours.

Figure 12:
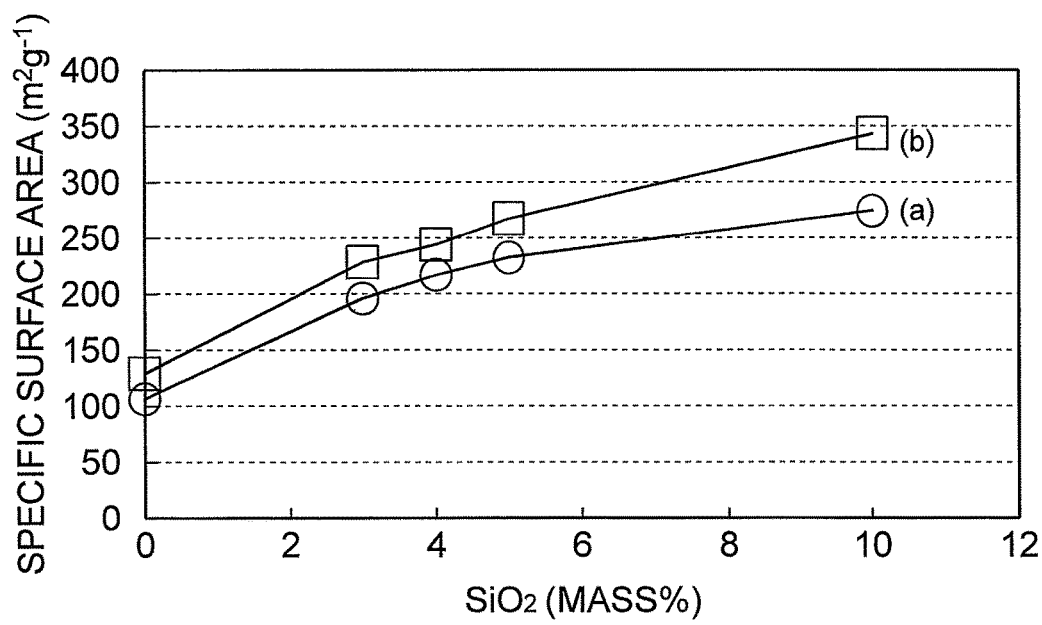
FIG. 12 is a graph illustrating the relationship between the specific surface area of porous alumina materials and $SiO_2$ concentration.
Figure 13:
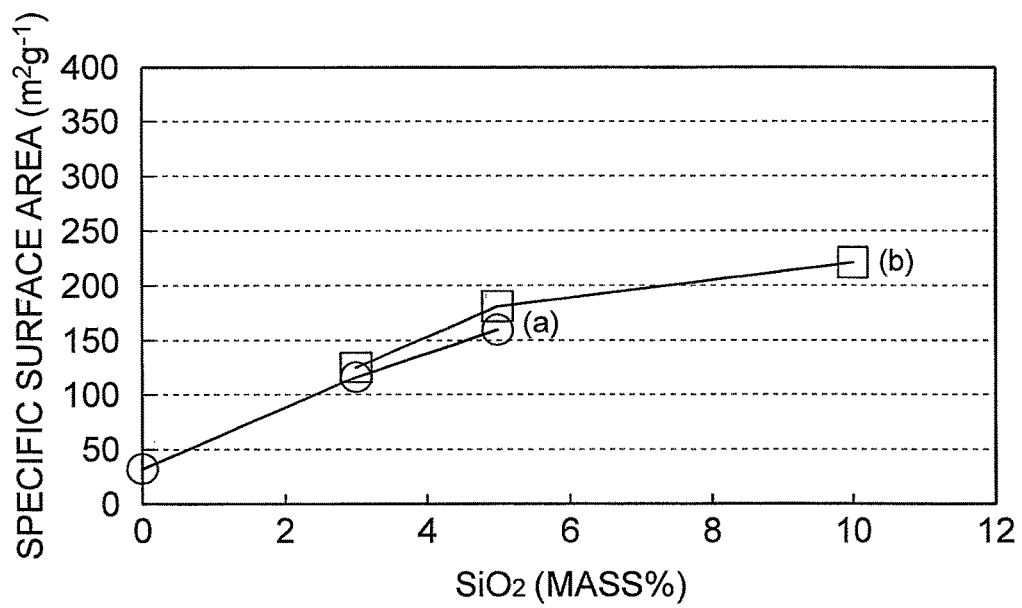
FIG. 13 is a graph illustrating the relationship between the specific surface area of porous alumina materials and $SiO_2$ concentration.
Figure 14:
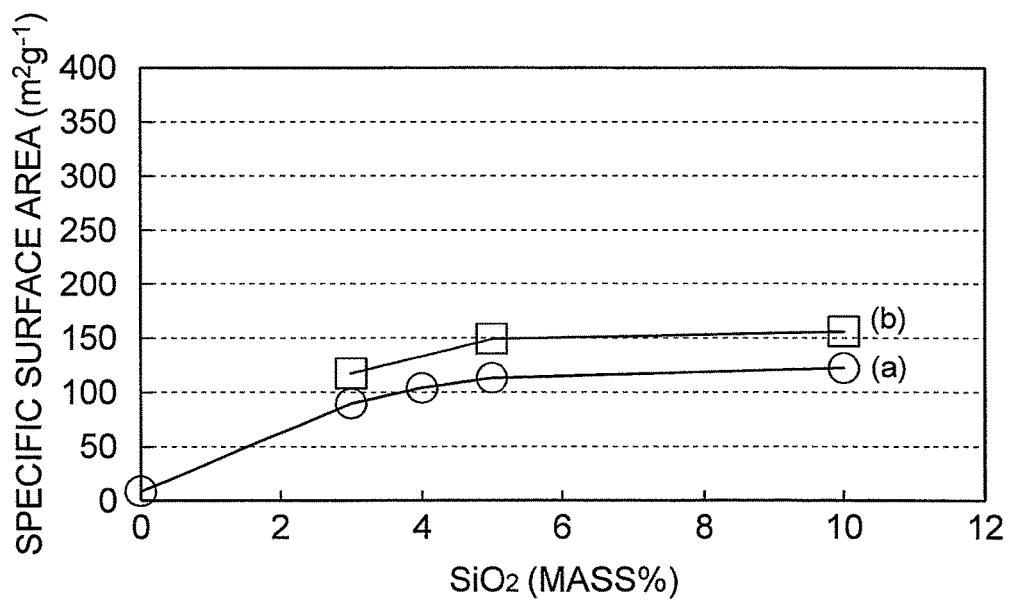
FIG. 14 is a graph illustrating the relationship between the specific surface area of porous alumina materials and $SiO_2$ concentration.

FIG. 12 is a graph illustrating the relationship between SiO$_2$ concentration and the specific surface area in porous alumina materials obtained through baking at 1000° C. for 5 hours. FIG. 13 is a graph illustrating the relationship between SiO$_2$ concentration and the specific surface area in porous alumina materials obtained through baking at 1200° C. for 5 hours. FIG. 14 is a graph illustrating the relationship between SiO$_2$ concentration and the specific surface area in porous alumina materials having been subjected to aging at 700° C. in an 18 MPa high-pressure water vapor atmosphere for 24 hours. In FIG. 12 to FIG. 14, (a) denotes porous alumina materials prepared without addition of DMF, and (b) denotes porous alumina materials prepared with addition of 10 g of DMF. It was found that the specific surface area of the porous alumina materials tended to increase through addition of DMF, for all the baking conditions.

Figure 15B:
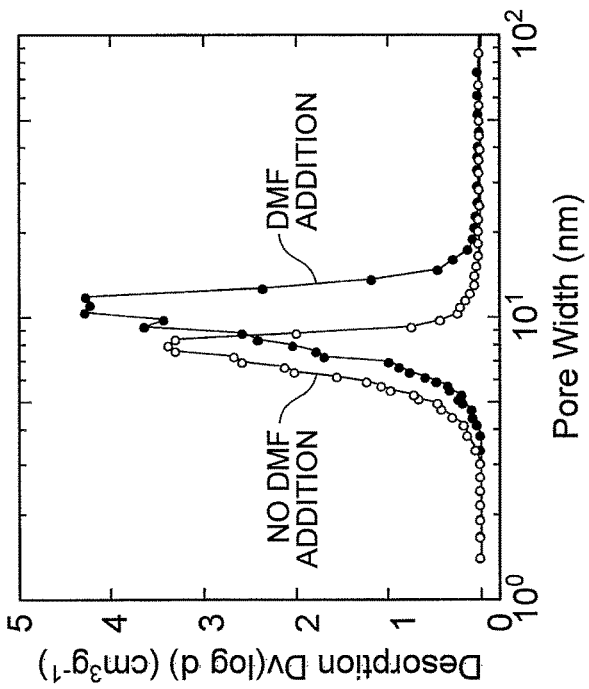
FIG. 15A and FIG. 15B are a set of graphs illustrating pore distributions of porous alumina materials.
Figure 15A:
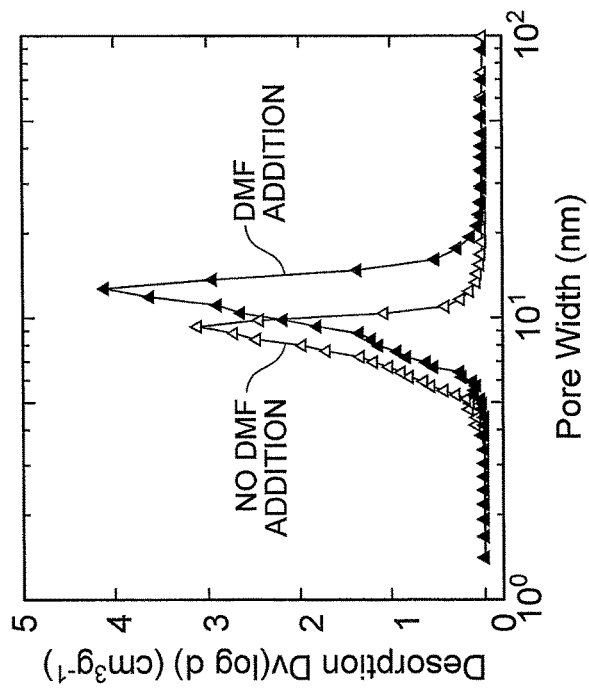

FIG. 15A and FIG. 15B are graphs illustrating pore distributions of porous alumina materials obtained through baking at 1000° C. for 5 hours. FIG. 15A corresponds to pore distributions in a case where the SiO$_2$ concentration was 3 mass %, and FIG. 15B corresponds to pore distributions in a case where the $SiO_2$ concentration was 5 mass %. As FIG. 15A and FIG. 15B show, the pore size tended to increase through the use of DMF. The pore size peak shifted from 93 nm to 127 nm as a result of using DMF in the case of a porous alumina material having a $SiO_2$ concentration of 3 mass %. The pore size peak shifted from 79 nm to 111 nm through the use of DMF in the case of a porous alumina material having a $SiO_2$ concentration of 5 mass %.

The porous alumina material having a $SiO_2$ concentration of 3 mass % exhibited a specific surface area of 189 $m^2/g$ and a total pore volume of 0.5 $cm^3/g$ when no DMF was added. The specific surface area increased to 218 $m^2/g$ and the total pore volume to 0.79 $cm^3/g$, respectively, through addition of DMF. The porous alumina material having a $SiO_2$ concentration of 5 mass % exhibited a specific surface area of 238 $m^2/g$ and a total pore volume of 0.58 $cm^3/g$ when no DMF was added. The specific surface area increased to 275 $m^2/g$ and the total pore volume to 0.94 $cm^3/g$, respectively, through addition of DMF.

Thus, it was confirmed that the pore size and the specific surface area of the porous alumina materials were further increased through the use of DMF.

5-2 Organic Solvents Other than DMF

Porous alumina materials having a $SiO_2$ concentration of 3 mass % were prepared through baking at 1000° C. for 5 hours, in accordance with a procedure identical to that of "5-1 Addition of DMF", but herein DMF was changed to the various organic solvents given in Table 4. As Table 5 shows, it was found that the specific surface area of the porous alumina materials increased through the use of various organic solvents having a smaller surface tension than that of water.

TABLE 4

| Organic solvent | Specific surface area $m^2/g$ |
|---|---|
| None | 188 |
| DMF | 251 |
| Ethylene glycol | 203 |
| 1,3-butanediol | 225 |
| 1,4-butanediol | 232 |
| 1,2-propanediol | 221 |
| 1,3-propanediol | 203 |
| Ethanol | 214 |

6. Considerations on the Aluminum Compound

Porous alumina materials having a $SiO_2$ concentration of 10 mass % were prepared through baking at 1000° C. for 5 hours in accordance with a procedure identical to that of "5-1 Addition of DMF", but herein the aluminum salts given in Table 5 were used as the aluminum compound in the starting materials. The crystal structure and the specific surface area of the obtained porous alumina materials were measured.

TABLE 5

| Starting material Al salt | $SiO_2$ mass % | Crystal structure | Specific surface area $m^2/g$ |
|---|---|---|---|
| $Al(NO_3)_3 \cdot 9H_2O$ | 10 | γ | 323 |
| $AlCl_3 \cdot 6H_2O$ | 10 | γ | 269 |
| $Al_2(SO_4)_3$ | 10 | γ | 182 |

Porous alumina materials having a $SiO_2$ concentration of 3 mass % or 10 mass % were prepared through baking at 1000° C. or at 1200° C. for 5 hours, in accordance with procedures identical to those of (1) and (2) in "2. Considerations on $SiO_2$ blending amount", but herein the aluminum salts or aluminum hydroxide given in Table 6 were used as the aluminum compound in the starting materials. In the case where aluminum hydroxide ($Al(OH)_3$) was used as the starting material, a transparent aluminum hydroxide aqueous solution was prepared by adding 33.5 g of 30% nitric acid (nitric acid:water=1:1) to 4.16 g of aluminum hydroxide, with heating under reflux for 12 hours. Then the tetraethoxysilane solution was added to the aluminum hydroxide aqueous solution, and water was further added so as to bring the total liquid amount to 100 g. The crystal structure and the specific surface area of the obtained porous alumina materials were measured.

TABLE 6

| Al compound in starting material | Baking temperature ° C. | $SiO_2$ mass % | Crystal structure | Specific surface area $m^2/g$ |
|---|---|---|---|---|
| $Al(NO_3)_3 \cdot 9H_2O$ | 1000 | 3 | γ | 196 |
| $Al(OH)_3$ | 1000 | 3 | γ | 191 |
| $AlCl_3 \cdot 6H_2O$ | 1000 | 3 | γ | 159 |
| $Al_2(SO_4)_3$ | 1000 | 3 | γ | 131 |
| $Al(NO_3)_3 \cdot 9H_2O$ | 1200 | 3 | θ | 81 |
| $Al(OH)_3$ | 1200 | 3 | θ | 81 |
| $AlCl_3 \cdot 6H_2O$ | 1200 | 3 | α + θ | 58 |
| $Al_2(SO_4)_3$ | 1200 | 3 | α | 29 |
| $Al(NO_3)_3 \cdot 9H_2O$ | 1000 | 10 | γ | 277 |
| $Al(OH)_3$ | 1000 | 10 | γ | 284 |

As Tables 5 and 6 show, it was found that using aluminum nitrate or aluminum hydroxide as a starting material was helpful in order to increase the specific surface area.

7. Considerations on the Addition of Compounds Other than the Silicon Compound

A transparent aluminum aqueous solution was prepared by adding 16.75 g of nitric acid and 16.75 g of water to 4.16 g of aluminum hydroxide, with heating under reflux for 15 hours. The aluminum aqueous solution was filtered, and then lanthanum nitrate, barium nitrate, magnesium nitrate or cerium nitrate was added, in a charge amount ranging from 1 to 30 wt %, and water was further added to bring the total liquid amount to 100 g. Each obtained solution was heated at 60° C., and aqueous ammonia (30%) was dripped onto the solution until the pH reached 8. The solution was then stirred for 30 minutes. Aluminum hydroxide was co-precipitated with a La compound and so forth as the aqueous ammonia was dripped, and a precipitate precipitated in the solution. Each precipitate was water-washed in 50 mL of warm water at 60° C., with stirring for 10 minutes, and was then filtered again. This water washing operation was performed once more. The water comprising the precipitate after water washing was heated under reflux for 2 hours, and the precipitate was taken out by filtration. Next, the precipitate was dried for 20 hours in a dryer at 150° C. Thereafter, the dried precipitate was crushed using a mortar, and was baked at 1000° C. or at 1200° C. for 5 hours in air, to yield a porous alumina material comprising $La_2O_3$, BaO, MgO or $CeO_2$. Porous alumina materials comprising $SiO_2$ were then prepared in accordance with a method identical to the above-described one, using the tetraethoxysilane solution obtained in accordance with a procedure identical to that of (1) in "2. Considerations on $SiO_2$ blending amount".

Figure 16:
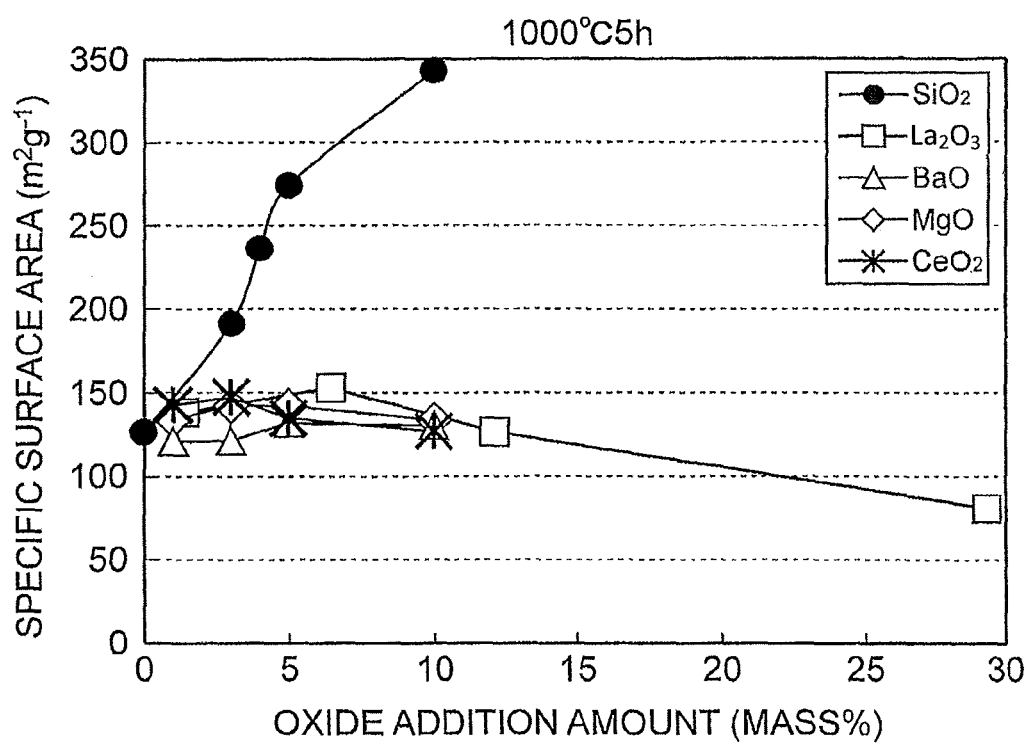
FIG. 16 is a graph illustrating the relationship between the specific surface area of porous alumina materials and oxide concentrations.
Figure 17:
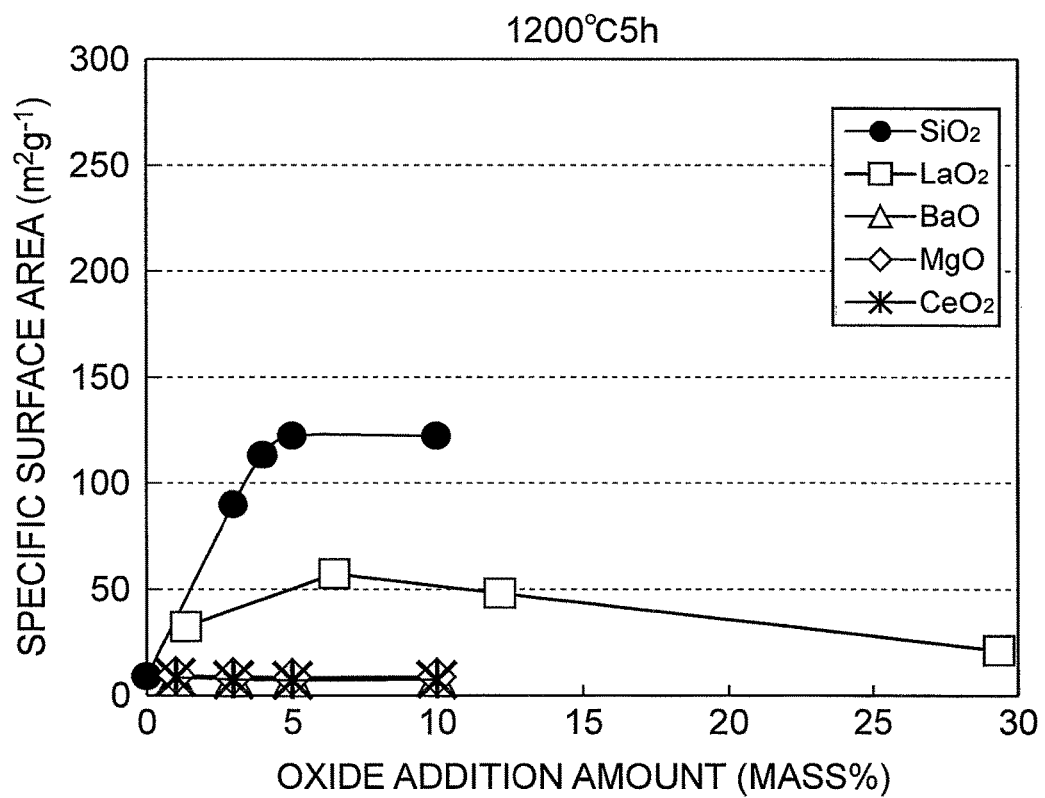
FIG. 17 is a graph illustrating the relationship between the specific surface area of porous alumina materials and oxide concentrations.

FIG. 16 and FIG. 17 are graphs illustrating the relationship between the specific surface area of the porous alumina material and the concentration of the various oxides. Herein, $La_2O_3$ elicited, among oxides other than $SiO_2$, an effect of increasing heat resistance upon baking at 1200° C., but SiO$_2$ exhibited nonetheless a yet superior effect of increasing heat resistance.

8. Considerations on the Precipitant

Figure 18:
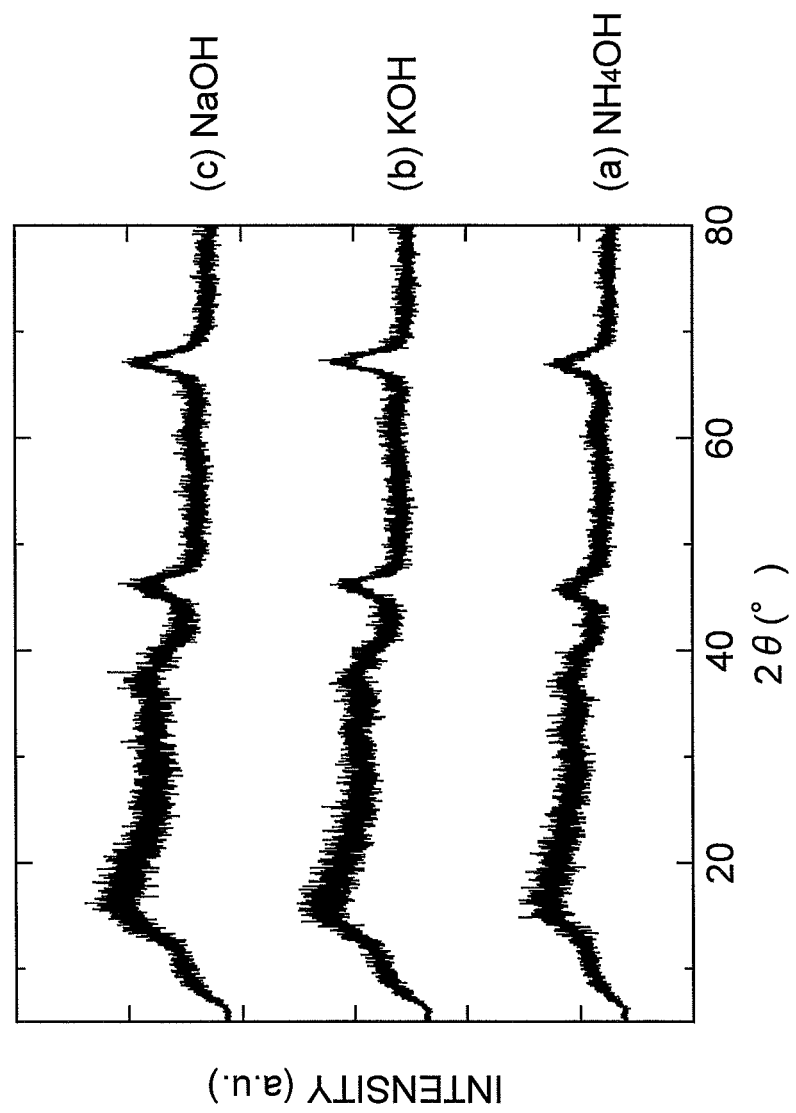
FIG. 18 is a graph illustrating XRD patterns of porous alumina materials.
Figure 19:
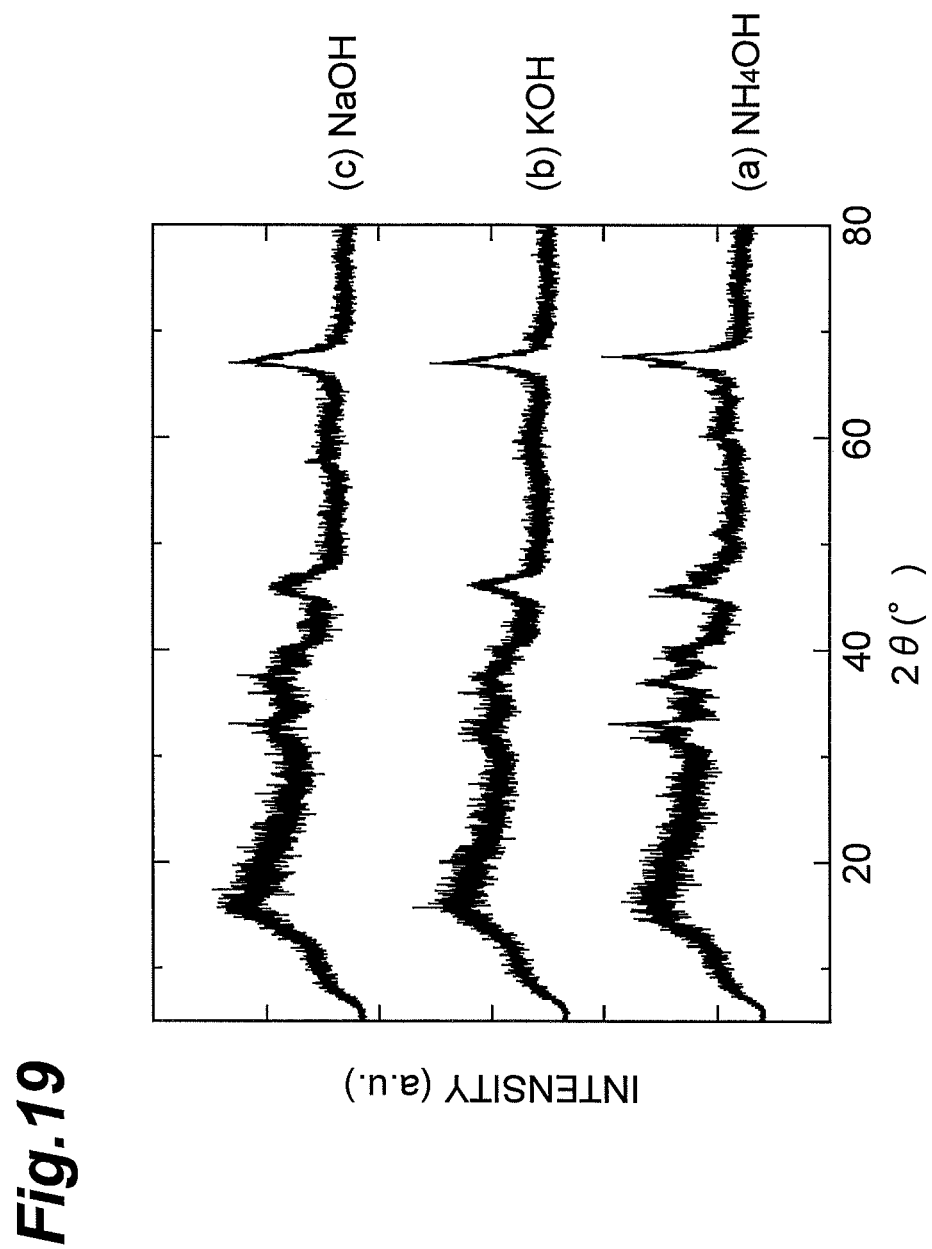
FIG. 19 is a graph illustrating XRD patterns of porous alumina materials.

30% nitric acid (nitric acid:water=1:1) were added to 4.16 g of aluminum hydroxide, with heating under reflux for 12 hours, to prepare a transparent aluminum aqueous solution. A tetraethoxysilane solution prepared in accordance with a procedure identical to that of (1) of "2. Considerations on SiO$_2$ blending amount" was added to the aluminum aqueous solution, and water was further added to bring the total liquid amount to 100 g. Then a 30% aqueous ammonia (NH$_4$OH), a 10% KOH aqueous solution or a 10% NaOH aqueous solution was dripped onto the obtained mixed solution, until pH reached 8, after which the solution was stirred for 30 minutes. Aluminum hydroxide and a silicon compound co-precipitated as the aqueous ammonia or the like was dripped, and a precipitate precipitated in the solution. The operation thereafter involved baking at 1000° C. or 1200° C., in accordance with a procedure identical to that of (2) in "2. Considerations on SiO$_2$ blending amount", to yield a porous alumina material comprising 3 mass % of SiO$_2$. The crystal structure and the specific surface area of the obtained porous alumina material were measured. FIG. 18 and FIG. 19 are graphs illustrating XRD patterns of the respective porous alumina materials obtained through baking at 1000° C. or 1200° C. Virtually no formation of α phase could be observed in any of the materials. The porous alumina materials obtained using aqueous ammonia exhibited the highest specific surface area.

TABLE 7

| SiO$_2$ mass % | Precipitant | Baking temperature ° C. | Specific surface area m$^2$/g | Crystal structure |
| --- | --- | --- | --- | --- |
| 3 | NH$_4$OH | 1000 | 191 | γ |
| 3 | KOH | 1000 | 130 | γ |
| 3 | NaOH | 1000 | 117 | γ |
| 3 | NH$_4$OH | 1200 | 81 | θ |
| 3 | KOH | 1200 | 74 | θ |
| 3 | NaOH | 1200 | 54 | θ |

9. Considerations on Precipitate Formation Temperature and the Precipitate Drying Temperature 33.5 g of 30% nitric acid (nitric acid:water=1:1) were added to 4.16 g of aluminum hydroxide, with heating under reflux for 12 hours, to prepare a transparent aluminum aqueous solution. Porous alumina materials comprising 3 mass % of SiO$_2$ were prepared out of this aluminum aqueous solution in accordance with procedures identical to those of (1) and (2) in "2. Considerations on SiO$_2$ blending amount" (temperature of precipitate formation by co-precipitation: 60° C.; precipitate drying temperature: 150° C.). Further, porous alumina materials comprising 3 mass % of SiO$_2$ were prepared in accordance with the same operation as above, but modifying the temperature of precipitate formation by co-precipitation to 20° C., and the precipitate drying temperature to 20° C. The crystal structure and the specific surface area of the obtained porous alumina materials were measured. The crystal structure of the precipitates after drying was likewise measured.

TABLE 8

| SiO$_2$ mass % | Precipitate formation temperature ° C. | Precipitate drying temperature ° C. | Baking temperature ° C. | Specific surface area m$^2$/g | crystal structure After drying | Alumina phase |
| --- | --- | --- | --- | --- | --- | --- |
| 3 | 20 | 20 | 1000 | 105 | Amorphous | γ |
|   |    |    | 1200 | 35  |            | α + θ |
| 3 | 60 | 150 | 1000 | 175 | Boehmite | γ |
|   |    |    | 1200 | 65  |          | θ |

As Table 8 shows, it was confirmed that the specific surface area tended to increase through heating of the precipitate. This can be attributed to the increase in heat resistance of the porous alumina material that results from the formation of fibrous particles by the boehmite (AlOOH) that is produced through heating of the precipitate.

10. Considerations on pH Upon Precipitate Formation

A tetraethoxysilane solution was prepared in accordance with the same operation as in (1) in "2. Considerations on SiO$_2$ blending amount". Then, 5 g or 8.4 g of the tetraethoxysilane solution were added to an aluminum nitrate aqueous solution obtained by dissolving 20 g of aluminum nitrate nonahydrate in 75 g of water, to yield a respective homogeneous mixed solution. Aqueous ammonia (30%) was then dripped onto the mixed solution, while the latter was heated at 60° C., until the pH was brought to a range from 6 to 11. A precipitate was formed thereby. The solution was stirred for 30 minutes after formation of the precipitate. Next, the precipitate was filtered off by suction filtration using No. 1 filter paper. The precipitate was water-washed in 50 mL of warm water at 60° C., with stirring for 10 minutes, and was then filtered again. This water washing operation was performed once more. The precipitate after water washing was dried for 20 hours in a dryer at 150° C. Thereafter, the dried precipitate was crushed using a mortar, and was baked at 1200° C. for 5 hours in air, to yield a respective porous alumina material comprising 3 mass % or 5 mass % of SiO$_2$, with respect to the total mass of SiO$_2$ plus Al$_2$O$_3$. A plurality of porous alumina materials were obtained by varying, within a range from 6 to 11, the pH of the mixed solution after dripping of the aqueous ammonia for forming the precipitate.

As a sample for comparison, a porous alumina material comprising no SiO$_2$ was prepared in accordance with the same operation as described above, but using herein no tetraethoxysilane solution.

Figure 20:
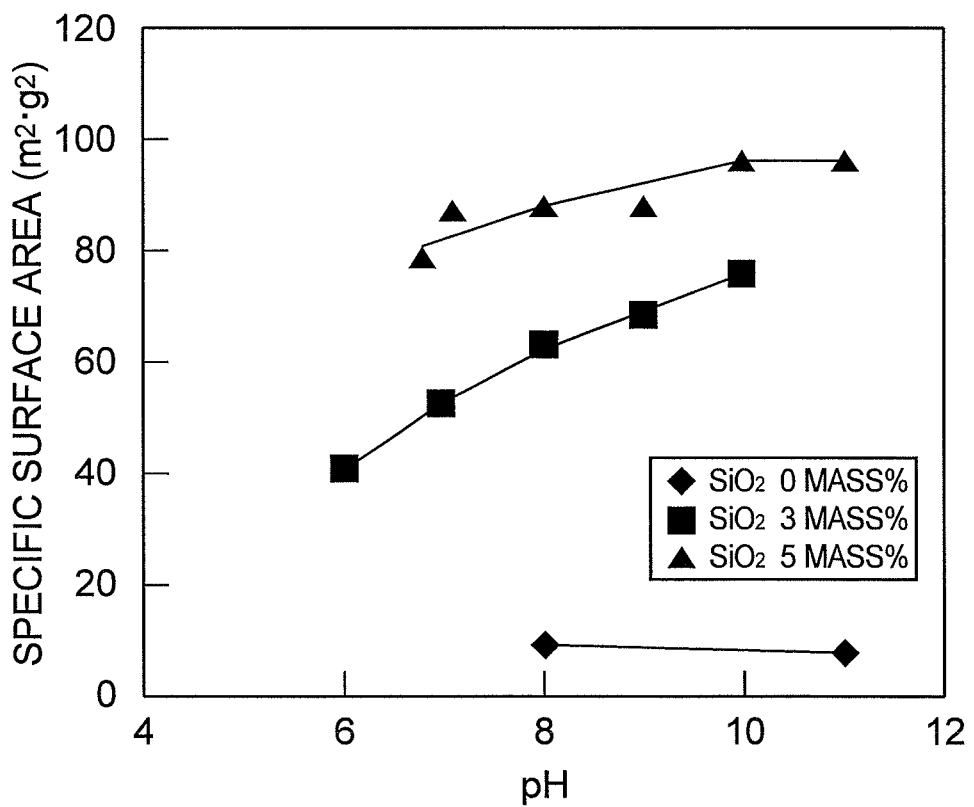
FIG. 20 is a graph illustrating the relationship between the specific surface area after a thermal treatment of porous alumina materials and the pH of mixed solutions in which a precipitate is formed.

The obtained porous alumina materials were thermally treated at 1200° C. for 5 hours. FIG. 20 is a graph illustrating the relationship between the specific surface area of the porous alumina materials after the thermal treatment, and the pH of the mixed solution at the time of precipitate formation. It was found that the surface area after the thermal treatment tended to increase with higher pH at the time of precipitate formation. This trend of increase in specific surface area was more pronounced when the proportion of SiO$_2$ was 3 mass % than when the proportion of SiO$_2$ was 5 mass %. In the case of porous alumina materials comprising no SiO$_2$, by contrast, the specific surface area decreased as sintering progressed in the thermal treatment, at all values of pH.

The invention claimed is:

1. A porous alumina material obtainable by a method comprising the steps of:
    mixing an alkoxysilane solution comprising an alkoxysilane, a mixed solvent and an inorganic acid, the mixed solvent comprising water and alcohol, with an aluminum solution comprising an aluminum compound and water, to prepare a mixed solution in which the aluminum compound and the alkoxysilane are dissolved in the mixed solvent;
    co-precipitating aluminum hydroxide with a silicon compound in the mixed solvent, to form a precipitate, wherein boehmite is formed in the precipitate after the co-precipitating; and
    baking the precipitate, after the boehmite is formed in the precipitate, to form a porous alumina material comprising aluminum oxide and silicon oxide,
    wherein the proportion of the silicon oxide with respect to the total mass of silicon oxide plus aluminum oxide in the porous alumina material is 1 mass % or more and 15 mass % or below,
    wherein the porous alumina material comprises at least one of γ-alumina, δ-alumina, or θ-alumina.

2. The porous alumina material according to claim 1, wherein the precipitate is baked to form the porous alumina material at a temperature above 1000° C. and 1200° C. or below.

3. The porous alumina material according to claim 1, wherein the porous alumina having a specific surface area of 65 m2/g or more and 323 m2/g or below.

4. A catalyst, comprising:
    the porous alumina material according to claim 1; and
    a catalyst substance that is supported on the porous alumina material.

5. The porous alumina material according to claim 1, wherein the porous alumina material comprises δ-alumina.

* * * * *